(12) United States Patent
Tsai et al.

(10) Patent No.: US 9,201,650 B2
(45) Date of Patent: Dec. 1, 2015

(54) SUPER I/O MODULE AND CONTROL METHOD THEREOF

(75) Inventors: Hsi-Jung Tsai, Hsinchu (TW);
Yueh-Yao Nain, Hsinchu County (TW);
Hao-Yang Chang, Miaoli County (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 560 days.

(21) Appl. No.: 13/617,837

(22) Filed: Sep. 14, 2012

(65) Prior Publication Data

US 2013/0179671 A1    Jul. 11, 2013

(30) Foreign Application Priority Data

Jan. 5, 2012    (TW) .............................. 101100415 A

(51) Int. Cl.
*G06F 13/20* (2006.01)
*G06F 9/06* (2006.01)

(52) U.S. Cl.
CPC . *G06F 9/06* (2013.01); *G06F 13/20* (2013.01)

(58) Field of Classification Search
CPC ........ G06F 13/4022; G06F 13/20; G06F 9/06
See application file for complete search history.

(56) References Cited

U.S. PATENT DOCUMENTS

| 2004/0049617 | A1* | 3/2004 | Wang et al. | 710/100 |
| 2006/0015711 | A1* | 1/2006 | Bang | 713/2 |
| 2008/0307123 | A1* | 12/2008 | Cheng | 710/31 |
| 2010/0299560 | A1 | 11/2010 | Lin | |
| 2012/0110379 | A1* | 5/2012 | Shao et al. | 714/15 |
| 2013/0007430 | A1* | 1/2013 | Fan | 713/1 |
| 2013/0318513 | A1* | 11/2013 | Chu et al. | 717/168 |

FOREIGN PATENT DOCUMENTS

| CN | 101295253 A | 10/2008 |
| TW | 588282 B | 5/2004 |
| TW | 200809489 A | 2/2008 |
| TW | 200923783 A | 6/2009 |
| TW | 201042456 | 12/2010 |
| TW | 201115359 A1 | 5/2011 |

OTHER PUBLICATIONS

Office Action issued on Aug. 20, 2014 in correponding Taiwanese patent application No. 101100415.
Search Report issued on Aug. 19, 2014 in correponding Taiwanese patent application No. 101100415.

* cited by examiner

*Primary Examiner* — Nimesh G Patel
(74) *Attorney, Agent, or Firm* — Muncy, Geissler, Olds & Lowe, P.C.

(57) ABSTRACT

A super input/output (I/O) module for controlling a universal serial bus (USB) port of a computer system is provided. The super I/O module includes a USB host, a switch and a processor. The switch selectively couples the USB port of the computer system to the USB host or a controller of the computer system according to a switching signal. When a trigger event occurs, the processor provides the switching signal to control the switch, so as to couple the USB port of the computer system to the USB host and to transmit a basic input/output system (BIOS) code to a flash memory of the computer system via the switch and the USB port.

17 Claims, 2 Drawing Sheets

SUPER I/O MODULE AND CONTROL METHOD THEREOF

CROSS REFERENCE TO RELATED APPLICATIONS

This Application claims priority of Taiwan Patent Application No. 101100415, filed on Jan. 5, 2012, the entirety of which are incorporated by reference herein.

BACKGROUND OF THE INVENTION

1. Field of the Invention

The invention relates to a super Input/Output (I/O) module of a computer system, and more particularly to a super I/O module for controlling a Universal Serial Bus (USB) port of a computer system.

2. Description of the Related Art

At present, a Basic Input/Output System (BIOS) code for performing a booting procedure is stored in a Read Only Memory (ROM) of computer systems, such as a Serial Peripheral Interface (SPI) flash memory. When a computer system is powered on, a Central Processing Unit (CPU) may check whether each of the basic devices (a motherboard, a display card and so on) works properly according to the BIOS code, and then performs succeeding procedures. The BIOS code is used to manage the system date, display mode, flexible disc driving device, hard disc type, peripheral devices (e.g. communication port, print port etc.) and configurations of the Random Access Memory (RAM) and cache memory. Therefore, the BIOS code is an important bootstrap program when the computer system performs a booting procedure. Consequently, once the BIOS fails, the computer system can not perform the booting procedure or the computer system may easily become unstable.

When a booting procedure of a computer system fails, a maintenance engineer must open a housing of the computer, and then de-solder the ROM from the motherboard.

Next, the maintenance engineer uses a recorder to update the data stored in the de-soldered ROM. Next, the maintenance engineer solders the ROM that has been completely updated back to the main board, and then puts back the housing of the computer. Therefore, traditionally, the maintenance engineer must perform complicated procedures to update a BIOS code of the ROM. In addition, if the de-soldering or soldering of the ROM fails, the computer system can not normally work.

Therefore, a control method is desired to update a memory that stores a BIOS code without removing a housing/case of a computer system.

BRIEF SUMMARY OF THE INVENTION

An embodiment of a super I/O module for controlling a universal serial bus (USB) port of a computer system is provided. The super I/O module comprises a first USB host, a first switch and a processor. The first switch selectively couples the USB port of the computer system to the first USB host or a controller of the computer system according to a switching signal. The processor provides the switching signal to control the first switch when a trigger event occurs, so as to couple the USB port of the computer system to the first USB host and to transmit a basic input/output system (BIOS) code to a flash memory of the computer system via the first switch and the USB port.

Furthermore, an embodiment of a control method for a computer system is provided. The computer system comprises a super I/O module and a USB port. The USB port of the computer system is coupled to a first USB host of the super I/O module via a switch when a trigger event occurs. A basic input/output system (BIOS) code is transmitted to a flash memory of the computer system via the USB port by the first USB host of the super I/O module. The USB port of the computer system is coupled to a second USB host of a controller of the computer system via the switch when the BIOS code has been transmitted to and stored in the flash memory of the computer system.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
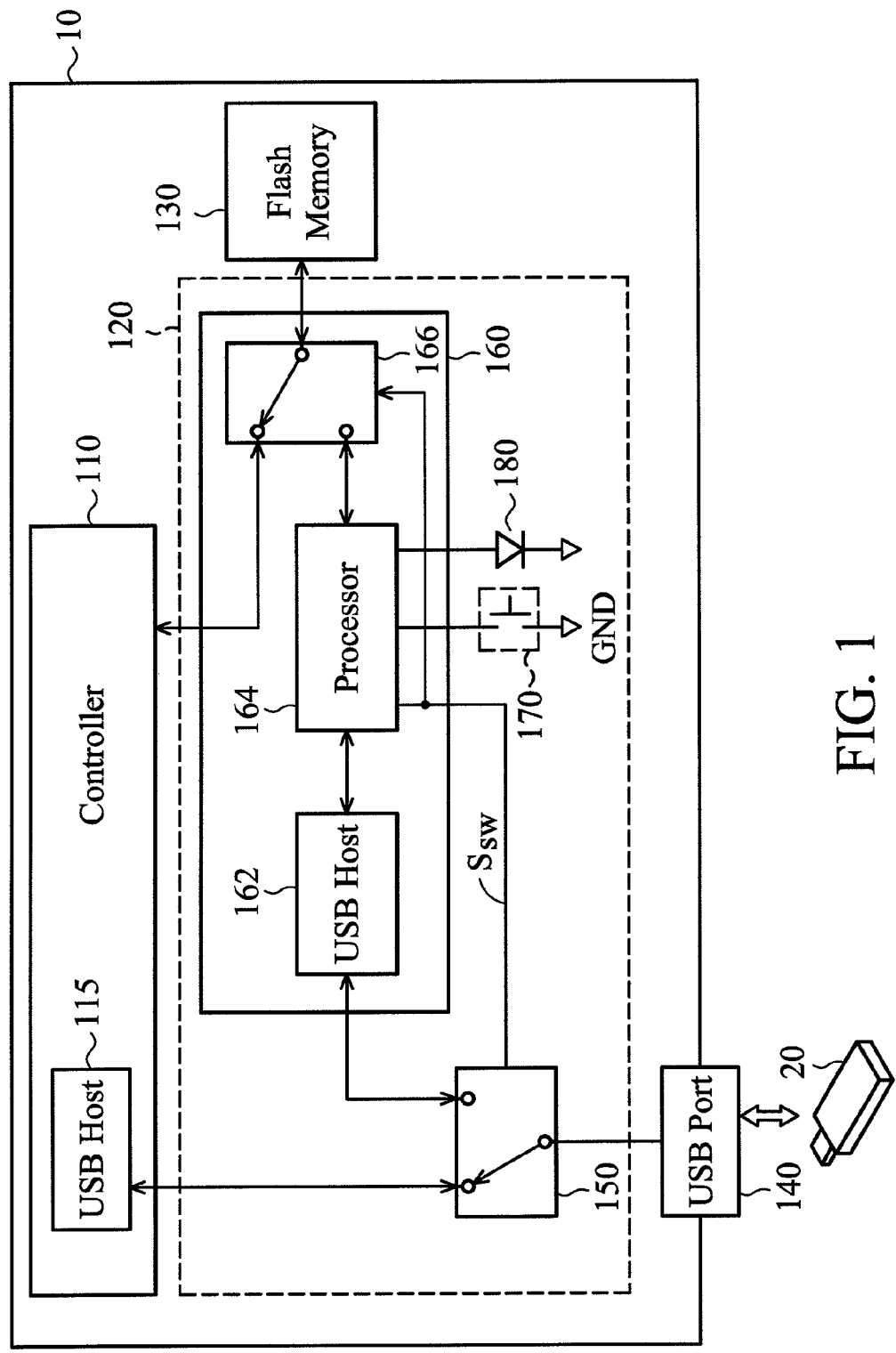
FIG. 1 shows a computer system according to an embodiment of the invention.

FIG. 1 shows a computer system 10 according to an embodiment of the invention. The computer system 10 comprises a controller 110, an integrated circuit (IC) module such as super input/output (I/O) module 120, a flash memory 130 and a universal serial bus (BUS) port 140, wherein the USB port 140 is a USB receptacle. In FIG. 1, the computer system 10 may connect to a USB device 20 (e.g. a USB disk) via the USB port 140. In the embodiment, the controller 110 may be a south bridge chip or a platform controller HUB (PCH) for connecting to the lower speed buses and devices of the computer system 10. In order to simplify the description herein, the central processing unit (CPU), north bridge chip, power module and so on will not further be described. The super I/O module 120 comprises a switch 150, an IC chip such as super I/O chip 160, a button 170 and a display device 180, wherein the button 170 and the display device 180 are disposed on a host casing of the computer system 10. The super I/O chip 160 comprises a USB host 162, a processor 164 and a switch 166. The switch 150 selectively couples the USB port 140 to a USB host 115 of the controller 110 or the USB host 162 of the super I/O chip 160 according to a switching signal S. In a normal mode, the processor 164 provides the switching signal $S_{SW}$ to control the switches 150 and 166, so as to couple the USB port 140 to the USB host 115 of the controller 110 via the switch 150 and to couple the flash memory 130 to the controller 110 via the switch 166. In other words, the controller 110 transmits a basic input/output system (BIOS) code stored in the flash memory 130 to the CPU via the switch 166 when a booting procedure is performed by the computer system 10. Furthermore, when the booting procedure is completed and the computer system 10 is operated in a normal mode, the USB host 115 of the controller 110 establishes a USB connection with the USB device 20 coupled to the USB port 140 via the switch 150 for data communications.

In the super I/O module 120, when the processor 164 detects that a trigger event has occurred, such as the button 170 has been pressed, the processor 164 provides the switching signal $S_{SW}$ to control the switches 150 and 166, so as to couple the USB port 140 to the USB host 162 of the super I/O module 120 and to couple the flash memory 130 to the processor 164. In one embodiment, the trigger event indicates that the processor 164 has detected that the computer system 10 is unable to perform a booting procedure. Thus, a USB connection is established between the USB host 162 and the USB device 20. Next, the processor 164 controls the USB host 162 to read the data stored in the USB device 20 and obtains the BIOS code, and then the obtained BIOS code is transmitted to and stored in the flash memory 130. Simultaneously, the processor 164 further uses the display device 180 to display a message regarding that the flash memory 130 of the computer system 10 is being updated, so as to notify a user. In the embodiment, the display device 180 can be a light emitting diode (LED). Therefore, when the BIOS code of the USB device 20 is being transmitted to the flash memory 130, the processor 164 lights the LED to notify the user until the BIOS code of the USB device 20 has been stored in the flash memory 130. In the embodiment, lighting the LED is an example and does not limit the invention. After the BIOS code from the USB device 20 is stored in the flash memory 130, the processor 164 provides the switching signal $S_{SW}$ to control the switches 150 and 166 again, so as to couple the USB port 140 back to the USB host 115 of the controller 110 and to coupled the flash memory 130 back to the controller 110. Thus, the controller 110 reads the updated BIOS code within the flash memory 130 via the switch 166, and then the controller 110 performs a booting procedure of the computer system 10 according to the read BIOS code.

Therefore, when detecting that the USB device 20 is connected to the USB port 140, the super I/O 120 further detects whether a trigger event has occurred, such as the button 170 is pressed or a booting procedure can not be performed. Once the trigger event occurs, the super I/O module 120 may update the flash memory 130 according to the data of the USB device 20. For example, a user may press the button 170, to update the BIOS code of the flash memory 130 according to the BIOS code of the USB device 20. Thus, a user can update the BIOS code of the flash memory 130 without removing a housing of the computer system 10. According to the embodiment, the super I/O module 120 and the controller 110 may share the USB port 140 of the computer system 10, thereby decreasing the used space on a motherboard of the computer system 10.

Figure 2:
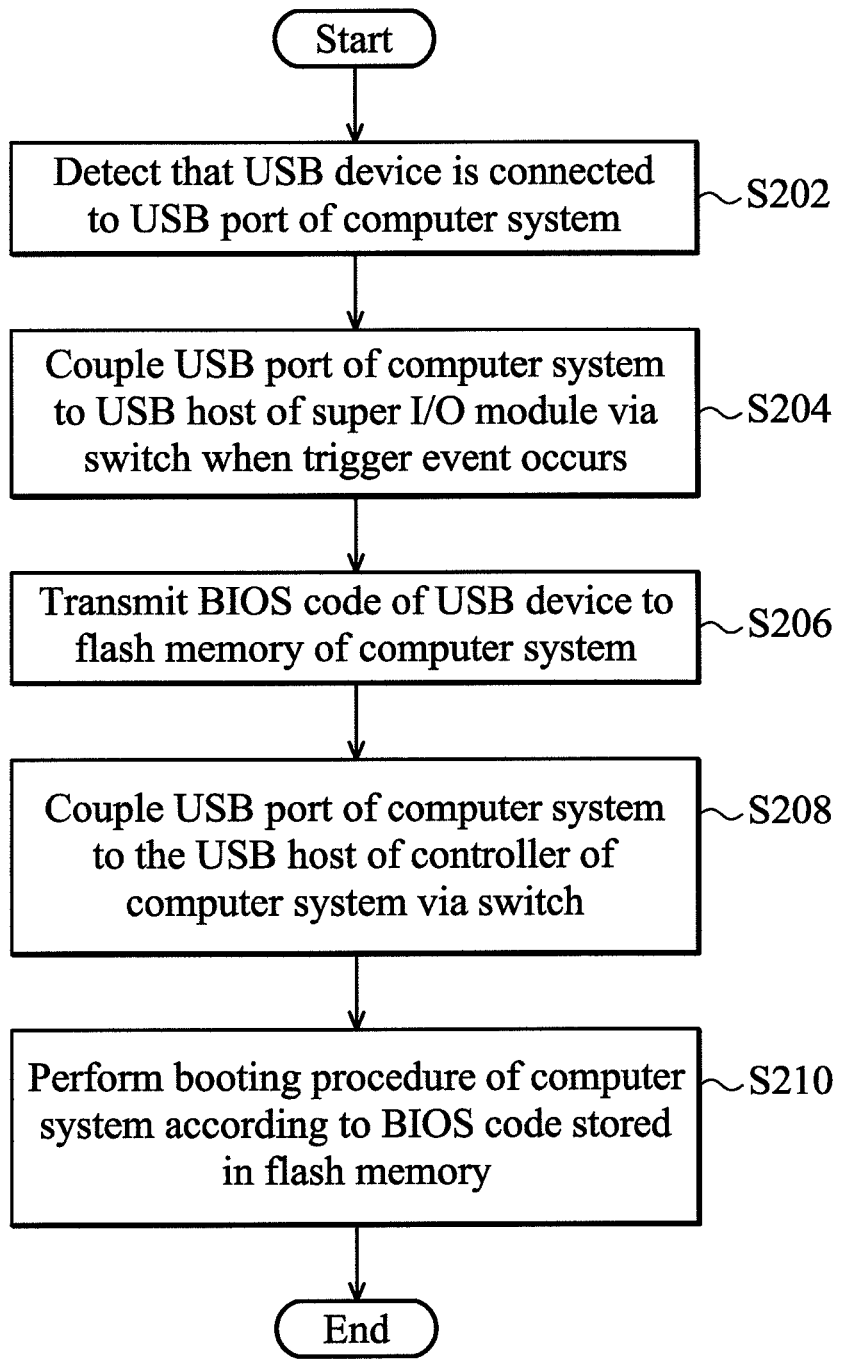
FIG. 2 shows a control method for the computer system having the super I/O module of FIG. 1 according to an embodiment of the invention.

FIG. 2 shows a control method for the computer system 10 having the super I/O module 120 of FIG. 1 according to an embodiment of the invention. Referring to FIG. 2 accompanying with FIG. 1, first, in step S202, the controller 110 detects that the USB device 20 is connected to the USB port 140 of the computer system 10. Next, the button 170 is pressed and the processor 164 detects that a trigger event has occurred. When the trigger event occurs, the processor 164 provides the switching signal $S_{SW}$ to control the switches 150 and 166, so as to couple the USB port 140 to the USB host 162 of the super I/O module 120 and to couple the flash memory 130 to the processor 164 (step S204). Next, the BIOS code of the USB device 20 is transmitted to the flash memory 130 via the switch 150 and the super I/O module 120 (step S206). When the BIOS code is transmitted to and stored in the flash memory 130, the processor 164 provides the switching signal $S_{SW}$ to control the switches 150 and 166, so as to couple the USB port 140 to the USB host 115 of the controller 110 and to couple the flash memory 130 to the controller 110 (step S208). Next, the controller 110 reads the BIOS code stored in the flash memory 130 via the switch 166, and performs a booting procedure of the computer system 10 according to the BIOS code read from the flash memory 130 (step S210).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A super input/output (I/O) module for controlling a universal serial bus (USB) port of a computer system, comprising:
    a first USB host;
    a first switch, selectively coupling the USB port of the computer system to the first USB host or a controller of the computer system according to a switching signal; and
    a processor, providing the switching signal to control the first switch when a trigger event occurs, so as to couple the USB port of the computer system to the first USB host, such that a basic input/output system (BIOS) code is transmitted to a flash memory of the computer system via the USB port, the first switch, the first USB host, and the processor in sequence.

2. The super I/O module as claimed in claim 1, wherein when the BIOS code has been transmitted to and stored in the flash memory of the computer system, the processor provides the switching signal to control the first switch, so as to couple the USB port of the computer system to a second USB host of the controller of the computer system without through the first USB host.

3. The super I/O module as claimed in claim 1, further comprising:
    a second switch, selectively coupling the flash memory of the computer system to the processor or the controller of the computer system according to the switching signal,
    wherein when the trigger event occurs, the processor further provides the switching signal to control the second switch, so as to couple the flash memory of the computer system to the processor,
    wherein the trigger event indicates that the processor detects that the computer system is unable to perform a booting procedure.

4. The super I/O module as claimed in claim 3, wherein when the BIOS code has been transmitted to and stored in the flash memory of the computer system, the processor provides the switching signal to control the second switch, so as to couple the flash memory of the computer system to the controller of the computer system.

5. The super I/O module as claimed in claim 4, wherein the controller of the computer system reads the BIOS code stored in the flash memory of the computer system via the second switch, so as to perform a booting procedure of the computer system.

6. The super I/O module as claimed in claim 3, wherein the first USB host, the processor and the second switch are implemented in a super I/O chip of the computer system.

7. The super I/O module as claimed in claim 1, wherein the controller of the computer system is a south bridge chip or a platform controller HUB (PCH).

8. The super I/O module as claimed in claim 1, further comprising:
a button, wherein the trigger event indicates that the button has been pressed.

9. The super I/O module as claimed in claim 1, wherein the trigger event indicates that the processor detects that the computer system is unable to perform a booting procedure.

10. The super I/O module as claimed in claim 1, further comprising:
a display device, displaying a message indicating that the flash memory of the computer system is being updated when the USB port of the computer system is coupled to the first USB host by the first switch.

11. A control method for a computer system, wherein the computer system comprises a super input/output (I/O) module and a universal serial bus (USB) port, comprising:
coupling the USB port of the computer system to a first USB host of the super I/O module via a switch when a trigger event occurs, by a processor of the super I/O module;
transmitting a basic input/output system (BIOS) code to a flash memory of the computer system via the USB port, the switch, the first USB host, and the processor in sequence; and
coupling the USB port of the computer system to a second USB host of a controller of the computer system via the switch when the BIOS code has been transmitted to and stored in the flash memory of the computer system, by the processor of the super I/O module.

12. The control method as claimed in claim 11, further comprising:
detecting whether the USB port of the computer system is connected with a USB device, wherein the BIOS code is provided by the USB device.

13. The control method as claimed in claim 11, further comprising:
performing a booting procedure of the computer system according to the BIOS code stored in the flash memory of the computer system.

14. The control method as claimed in claim 11, wherein the controller of the computer system is a south bridge chip or a platform controller HUB (PCH).

15. The control method as claimed in claim 11, wherein the trigger event indicates that a button of the computer system has been pressed.

16. The control method as claimed in claim 11, wherein the trigger event indicates that the super I/O module has detected that the computer system is unable to perform a booting procedure.

17. The control method as claimed in claim 11, wherein the step of transmitting the BIOS code to the flash memory of the computer system further comprises:
displaying a message indicating that the flash memory of the computer system is being updated via a display device.

* * * * *